May 21, 1935. L. R. COLLAR 2,001,773
CONVEYER CURVE
Filed April 8, 1931
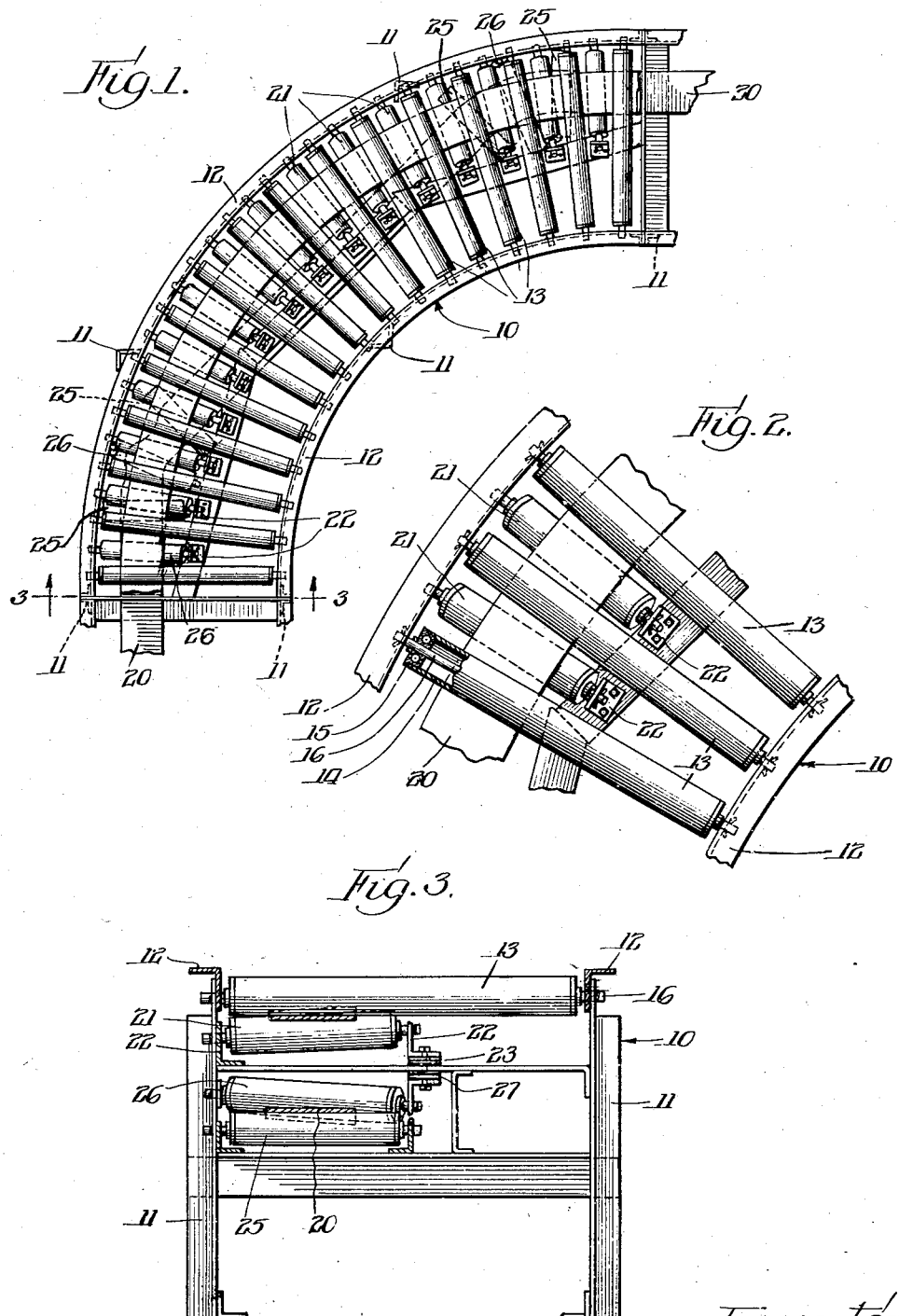
Inventor:
Linus R. Collar
By Chindahl, Parker & Carlson attys Patented May 21, 1935

2,001,773

UNITED STATES PATENT OFFICE 2,001,773

CONVEYER CURVE

Linus R. Collar, Chicago, Ill., assignor, by direct and mesne assignments, to The Lamson Company, Syracuse, N. Y., a corporation of Massachusetts Application April 8, 1931, Serial No. 528,508

8 Claims. (Cl. 198—127)

The invention relates generally to live or driven roller conveyers and more particularly to curves for such conveyers.

In live roller conveying systems, when it is desired to change the direction of travel in the system, a curve is placed in the system, the rollers of which are of the idler or gravity type if a vertical drop is available sufficient to carry the articles conveyed over the curve. In many cases, however, such a drop is not available and it is then necessary to provide a curve in which the rollers are driven.

Heretofore, in some curves of this type, the rollers are driven through a system of gearing, but obviously such structure is complicated and expensive to manufacture. In others of this type, the rollers are grouped in a plurality of relatively short straight sections, the rollers in each section being parallel with a belt drive for each section, while the sections are placed at angles to each other to approximate a smooth curve. This necessitates a belt for each section with drive mechanism therefor, and also results in sudden changes in direction of travel of the articles conveyed, thus tending to upset them or to throw them against the sides of the conveyers.

The general object of the invention is to provide a curve for a live roller conveyer which is simple and inexpensive to construct, and which conveys the articles without jarring.

Another object is to provide a curve of this character in which all the carrying rollers may be driven by a relatively simple mechanism and in which the change in direction of travel is substantially uniform throughout the length of the curve.

A further object is to provide a curve of this character in which the source of power is a single belt, which belt may be the same belt as that driving the rollers in the straight sections of the system leading up to and away from the curve, or may be a separate belt.

Other objects and advantages will become apparent from the following description taken in connection with the accompanying drawing, in which:

Figure 1 is a plan view of a curve embodying the features of the invention.

Fig. 2 is an enlarged fragmentary plan view of a portion of the curve shown in Fig. 1.

Fig. 3 is an enlarged vertical section taken substantially on the line 3—3 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present embodiment of the invention comprises briefly a frame supporting a plurality of carrying rollers lying substantially on radii of the curve, and a belt in contact with the under side of the carrying rollers for driving them. Placed alternately between the carrying rollers are a plurality of cinching rollers which hold the belt in contact with the carrying rollers and guide it from one carrying roller to the next. In the lower part of the frame, means is provided for guiding the return run of the belt.

The present embodiment, as shown in the drawing, comprises a frame indicated generally at 10. This preferably includes a plurality of uprights 11 on which are secured a pair of curved upper side members 12 extending around the innner and outer sides of the curve.

To support the articles conveyed, a plurality of carrying rollers 13 are rotatably mounted between the side members 12 with their axes lying substantially on radii of the curve and preferably in the same plane. The rollers 13 may be of any suitable type, the type illustrated comprising a tubular shell 14 (see Fig. 2) in the ends of which are mounted anti-friction bearings 15 supported on a shaft 16. The ends of the shaft extend through the side members 12 and are held against longitudinal movement as by cotton pins.

The carrying rollers 13 are driven by means of a belt 20, preferably a flat belt, held in contact with the underside of the rollers 13. This belt may be the one which drives the rollers in the straight sections leading up to and away from the curve as illustrated, or it may be a separate belt driven by a motor or the like.

Since the carrying rollers 13 lie substantially on radii of the curve and hence are at an angle to each other, means is provided for guiding the belt from one carrying roller to the next, which means also serves to hold the belt in good driving contact with the carrying rollers. As illustrated, this means comprises a plurality of cinching rollers 21 placed between the carrying rollers preferably alternately therewith to guide it from one carrying roller to another and bearing substantially upwardly on the belt to hold it in contact with the under side of the carrying rollers.

With the carrying rollers at an angle to each other, if the belt is of the flat type, the distance between adjacent carrying rollers at the inner edge of the belt is less than at the outer edge of the belt and varies proportionally therebetween. Both edges of the belt being of equal length, the belt should be guided so that the paths of the inner and outer edges of the belt between adjacent carrying rollers are equalized. To this end, that portion of each cinching roller which is in contact with the belt is positioned so that its inner end is higher than its outer end. In the present instance, each cinching roller 21 is cylindrical and is mounted with its inner end higher than its outer end so that its axis is canted at an angle to the plane of the carrying rollers and the plane in which the belt normally runs as it passes under the carrying rollers. Thus, the paths of the inner and outer edges of the belt may be equalized.

The cinching rollers 21 are rotatably supported in members 22 mounted on the frame 10. Should edges of the belt stretch unevenly in use, means is provided for adjusting the angle at which the cinching rollers are canted, which means comprises shims 23 (see Fig. 3) interposed between the members 22 and the frame.

As mentioned above, the invention also includes means for guiding the return run of the belt. This means may be used where the belt is the one driving the rollers in the straight sections leading up to and away from the curve, or where the belt is separate from the belts for the straight sections. In the present embodiment, this means comprises one or more pairs of rollers 25 mounted in the lower part of the frame, the number of such pairs depending upon the magnitude of the curve. The curve illustrated being 90 degrees, two such pairs are preferably employed, mounted adjacent the respective ends of the curve.

In each pair, the rollers 25 are mounted with their axes lying perpendicular to the belt as it leads up to and away from the respective rollers. Between each pair, a guide roller 26 is mounted with its inner end canted downwardly in order to guide the belt from one roller to the other of said pair. Thus, the return run of the belt is guided around the curve. The guide rollers 26 may be adjusted to provide for unequal stretching of the belt by means of shims 27.

From the above description, it will be apparent that I have provided a curve for a live roller conveyer which is simple and inexpensive to construct, since no complicated gearing and only one belt is employed. Since the carrying rollers all lie on radii of the curve, the change in direction of travel is substantially uniform throughout the length of the curve, and the articles will be conveyed without jarring due to sudden changes of direction.

I claim as my invention:

1. A curve for a live roller conveyer comprising, in combination, a plurality of non-parallel carrying rollers, a belt in contact with the underside of said rollers for driving them, a plurality of cinching rollers mounted alternately between said carrying rollers with their inner ends higher than their outer ends to take up the slack in the inner portion of said belt, and means for adjusting the difference in height between the ends of said cinching rollers to compensate for unequal stretching of said belt.

2. A curve for a live roller conveyer comprising, in combination, a curved frame, a plurality of carrying rollers mounted laterally in said frame, a belt in contact with the under side of said rollers for driving them, a plurality of cinching rollers mounted below said carrying rollers to hold the belt in driving contact therewith, said cinching rollers being canted at an angle to guide the belt from one carrying roller to the next, means for supporting said cinching rollers in said frame, and means for adjusting said angle to compensate for unequal stretching of said belt comprising shims interposed between the supporting means on one end of said rollers and said frame.

3. A curve for a live roller conveyer comprising, in combination, a frame, a plurality of carrying rollers mounted in the top of said frame with their axes lying on radii of the curve, a belt having one of its runs in contact with the under side of said rollers, a plurality of cinching rollers mounted in said frame below said carrying rollers to guide the belt from one carrying roller to the other, and means mounted in the lower part of said frame for guiding the return run of the belt comprising a pair of rollers having their axes perpendicular to the belt respectively as it leads up to and away from said means, and a guide roller mounted between said pair of rollers for guiding the belt from one of said pair to the other.

4. A curve for a live roller conveyer comprising, in combination, a curved frame, a plurality of carrying rollers mounted laterally in the top of said frame, a belt having one run in contact with the underside of said rollers, a plurality of cinching rollers mounted in said frame below said carrying rollers to guide the belt from one carrying roller to the other, and means mounted in the lower part of said frame for guiding the return run of said belt, said means comprising pairs of rollers mounted adjacent the respective ends of said frame, each of said pairs having their respective axes extending laterally of the belt as it leads up to and away from said pair, and guiding rollers mounted between the rollers of the respective pairs in a canted relation thereto to guide the belt from one to the other roller of each of said pairs.

5. A curved, live roller conveyer comprising a series of load supporting and transporting live rollers, a belt having flat sides for driving the live rollers, the belt being curved laterally in the direction of its width to follow the curve of the conveyer, and means for holding the belt in flatwise driving engagement throughout its width with the live rollers on the curve.

6. A curved, live roller conveyer comprising a series of load supporting and transporting live rollers, a belt having flat sides for driving the live rollers, the belt being curved laterally in the direction of its width to follow the curve of the conveyer, and means for taking up the slack of the flat belt at its inner edge as it passes around the curve.

7. A curved, live roller conveyer comprising a series of load supporting and transporting live rollers, a belt having flat sides for driving the live rollers, the belt being curved laterally in the direction of its width to follow the curve of the conveyer, and idler rollers between live rollers for holding the belt in flatwise driving engagement throughout its width with the live rollers on the curve, the idler rollers having their surfaces inclined to the driven surfaces of the live rollers so as to take up the slack of the flat belt at its inner edge as it passes around the curve.

8. A curved, live roller conveyer comprising a series of load supporting and transporting live rollers, a belt having flat sides for driving the live rollers, the belt being curved laterally in the direction of its width to follow the curve of the conveyer, and idler rollers between live rollers for holding the belt in flatwise driving engagement throughout its width with the live rollers on the curve, the idler rollers being journaled on axes inclined to the axes of the live rollers so as to take up the slack of the flat belt at its inner edge as it passes around the curve.

LINUS R. COLLAR.